United States Patent [19]
Luckevich et al.

[11] Patent Number: 5,542,756
[45] Date of Patent: Aug. 6, 1996

[54] REDUCED BRAKE SWITCH DEPENDENCE CONTROL METHOD AND SYSTEM FOR VEHICLE ANTI-LOCK BRAKE SYSTEM

[75] Inventors: Mark Luckevich; Brian C. Tuck; Darryl C. Weber, all of Ann Arbor, Mich.; James H. DeVore, Clarksville, Tenn.

[73] Assignee: Kelsey–Hayes Company, Livonia, Mich.

[21] Appl. No.: 383,982

[22] Filed: Feb. 6, 1995

Related U.S. Application Data

[63] Continuation-in-part of Ser. No. 101,200, Jul. 30, 1993, abandoned.

[51] Int. Cl.$^6$ ........................................................ B60T 8/88
[52] U.S. Cl. .................................. 303/122.11; 303/122.05
[58] Field of Search ................................ 303/92, 93, 100, 303/110, 113.4, 106, 155, 122, 122.02, 122.04, 122.05; 364/426.02

[56] References Cited

U.S. PATENT DOCUMENTS

| | | | |
|---|---|---|---|
| 4,953,092 | 8/1990 | Higashimura | 303/122.11 |
| 5,156,644 | 10/1992 | Franzke | 303/122.05 |

FOREIGN PATENT DOCUMENTS

| | | |
|---|---|---|
| 0328082 | 8/1989 | European Pat. Off. . |
| 0476587 | 3/1992 | European Pat. Off. . |

*Primary Examiner*—Matthew C. Graham
*Attorney, Agent, or Firm*—MacMillan, Sobanski & Todd

[57] ABSTRACT

A reduced brake switch dependence (RBSD) control method and system for a vehicle anti-lock brake system (ABS) having a brake switch. The control method includes generating a RBSD control signal when the brake switch is inoperative, and performing RBSD control of the ABS in response to the RBSD control signal. The control system includes wheel speed sensors, ABS control valves, and a programmable microprocessor ABS control unit for performing the control method.

6 Claims, 4 Drawing Sheets

REDUCED BRAKE SWITCH DEPENDENCE CONTROL METHOD AND SYSTEM FOR VEHICLE ANTI-LOCK BRAKE SYSTEM

CROSS REFERENCE TO RELATED APPLICATION

This application is a continuation-in-part of U.S. application Ser. No. 101,200, filed Jul. 30, 1993 and entitled REDUCED BRAKE SWITCH DEPENDENCE CONTROL METHOD AND SYSTEM FOR VEHICLE ANTI-LOCK BRAKE SYSTEM now abandoned.

TECHNICAL FIELD

This invention relates generally to vehicle anti-lock brake systems. More particularly, this invention relates to a reduced brake switch dependence control method and system for vehicle anti-lock brake systems.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems (ABS) are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical ABS comprise a vehicle wheel speed sensor as well as a brake switch for providing input to a control unit that controls ABS valves interposed between the master brake cylinder and the individual wheel brakes in the vehicle hydraulic brake circuit. The valves, in turn, regulate hydraulic brake fluid pressure in the individual wheel brakes to implement anti-lock braking.

In operation, the vehicle wheel speed sensor not only measures the vehicle wheel speed, but also provides input to the control unit for determining a vehicle speed. The brake switch indicates to the control unit the application of the brake pedal by the vehicle operator as a result of the operator's desire for vehicle braking. Typical ABS control units provide for anti-lock braking only in the event of an indication from the brake switch that the vehicle operator has called for vehicle braking through brake pedal application.

After application of the brake pedal by the vehicle operator, the control unit begins to monitor the vehicle wheel speeds for an indication of an anti-lock braking event. First, based upon an estimated vehicle speed, the control unit typically determines a slip threshold, which may be expressed as a selected velocity less than the vehicle speed.

Next, the control unit compares the vehicle wheel velocity to the slip threshold. During normal vehicle braking, the wheel velocity closely matches the vehicle velocity. However, during an ABS event, the wheel velocity decreases significantly below, or "departs" from, the vehicle velocity, and approaches the slip threshold.

In such a situation, as for example during hard braking on an ice covered road, the torque generated by the brake caliper and rotor assembly may exceed that generated by the vehicle wheel and the road surface. Uncontrolled, such a torque differential causes the vehicle wheel to cease rotating, or to "lock." In turn, locking causes the vehicle wheels to slip or "skid", rather than roll, over the road surface. Such vehicle wheel skidding dramatically reduces traction and the ability of the vehicle operator to bring the vehicle to a controlled stop.

To prevent such vehicle wheel lock and the accompanying problems, the ABS control unit activates the ABS valves to regulate brake fluid pressure in the individual wheel brakes during an ABS event. More specifically, the control unit compares the wheel velocity to the slip threshold and actuates the ABS valves when the wheel velocity falls below the slip threshold. In so doing, the individual vehicle wheel brakes in the hydraulic brake circuit are isolated from the master brake cylinder, thereby halting any increase in brake fluid pressure in the vehicle wheel brakes and preventing incipient wheel lock.

As previously mentioned, however, typical ABS provide for control of the vehicle brakes only where the control unit has received input from a brake switch indicating that the vehicle operator has applied the vehicle brake pedal in response to a desire for vehicle braking. As a result, in the event that the brake switch fails, ABS cannot and will not be activated, despite the fact that the vehicle operator may be applying the vehicle brakes and causing significant departures between the vehicle velocity and the wheel velocity. Thus, the entire purpose of ABS is corrupted by the failure of a single component.

It has therefore become increasingly desirable in the design of ABS to provide for fault tolerant operation. More specifically, it has become increasingly desirable to provide a control method and system for ABS having reduced brake switch dependence so as to provide for continued operability in the event of brake switch failure. Such an improved control method and system would also increase robust operation of ABS.

DISCLOSURE OF INVENTION

According to the present invention, a reduced brake switch dependence (RBSD) control method and system are provided for a vehicle anti-lock brake system (ABS) having a brake switch. The control method of the present invention comprises generating a RBSD control signal when the brake switch is inoperative, and performing RBSD control of the ABS in response to the RBSD control signal.

The control system of the present invention comprises means for generating a RBSD control signal when the brake switch is inoperative. The system further comprises means for performing RBSD control of the ABS in response to the RBSD control signal.

Accordingly, it is the principle object of the present invention to provide an improved control method and system for ABS that provides for reduced brake switch dependence.

This and other objects and advantages will be readily apparent upon consideration of the following description and drawings.

BEST MODE FOR CARRYING OUT THE INVENTION

According to the general aspects of the present invention, the method and system for controlling the vehicle ABS assume that the vehicle brake switch is inoperative until determining otherwise. Until such time, reduced brake switch dependence (RBSD) control of ABS is executed during an ABS event. Once the control method and system determine that the brake switch is operative, normal control of ABS is executed during an ABS event.

As used herein, normal control of ABS is defined as activation of ABS when a wheel velocity falls below a slip threshold having a normal operation level. The normal operation level of the slip threshold is defined as that slip threshold providing for the most effective operation of the anti-lock brake system, based on experience.

RBSD control of ABS is defined in terms of normal control of ABS. More specifically, RBSD control is defined as activation of ABS when a wheel velocity falls below a slip threshold having a low sensitivity level. The low sensitivity level of the slip threshold is defined as a selected velocity less than that of the normal operation level of the slip threshold.

In either RBSD or normal control of ABS, it should be noted that ABS activation is defined as cycling of the valves that regulate brake fluid pressure at the individual wheel brakes. ABS activation, and the cycling of such valves, does not lead to brake application unless and until the vehicle operator has depressed the vehicle brake pedal.

Given a slip threshold having a low sensitivity level as defined above, in the event of brake switch failure, a greater departure of wheel velocity from vehicle velocity is necessary before ABS will be activated. As a result, the control method of the present invention reduces the incidence of false activation of ABS as compared to brake switch independent ABS.

More specifically, the control method and system of the present invention assume that the vehicle brake switch is inoperative until such time as the brake switch generates a brake input signal indicating otherwise. In the absence of the brake input signal from the brake switch, the control method and system execute RBSD control of ABS during an ABS event. Once the brake input signal is generated by the brake switch, the control method and system execute normal control of ABS during an ABS event. Thus, it is a change in state of the brake input signal that signifies an operative brake switch.

In the event that the brake switch generates a brake input signal continuously, indicating a failure of the brake switch in the "on" position, the control method and system of the present invention may again execute RBSD control of ABS during an ABS event. A continuous brake input signal may be defined as a brake input signal generated from the time the control system of the present invention is powered up, typically at vehicle ignition, to the time that the vehicle reaches a selected velocity. Nevertheless, it is still the change in state of the brake input signal that signifies an operative brake switch.

Thus, according to the control method and system of the present invention, RBSD control of ABS will be executed during an ABS event when the brake switch is determined to be inoperative. In such a manner, the control method provides for reduced brake switch dependence as well as for continued operability of ABS in the event of brake switch failure.

Moreover, the preferred embodiment of the control method and system dispenses with the need for a more expensive brake switch, or a brake switch sensor, that would generate an independent signal in the event of brake switch failure, thereby providing for cost effective implementation. However, it is readily apparent that the control method and system of the present invention may be practiced using other means for determining brake switch failure, such as those just described.

As described generally above, the control method and system of the present invention provide for reduced brake switch dependence in ABS. More particularly, referring now to FIGS. 1a and 1b, a brake switch control flowchart of the present invention is shown, denoted generally by reference numeral 10. The brake switch control flowchart 10 determines and indicates the operativeness of the vehicle brake switch.

Figure 1A:
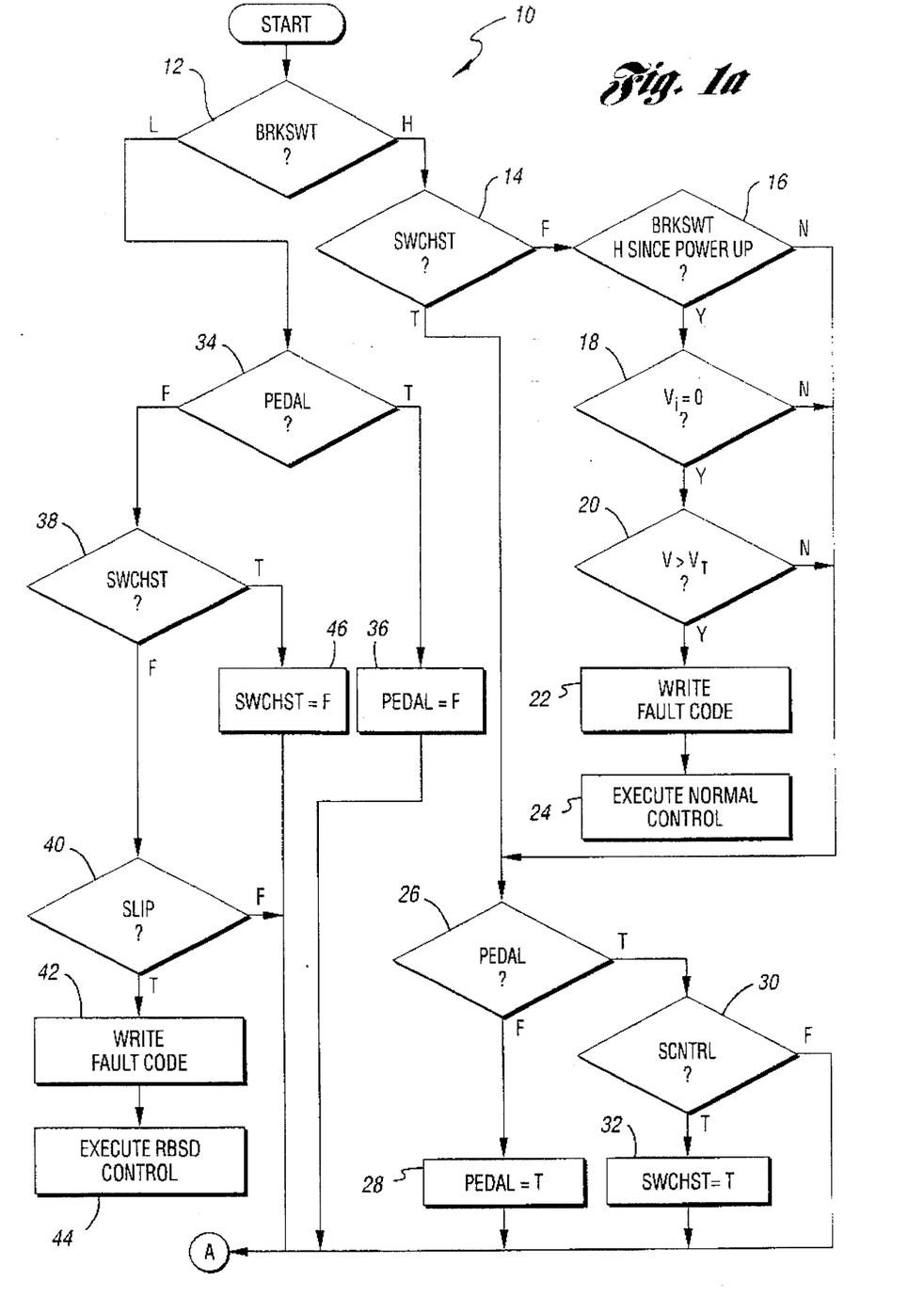
FIGS. 1a and 1b are a brake switch control flowchart of the present invention.
Figure 1B:
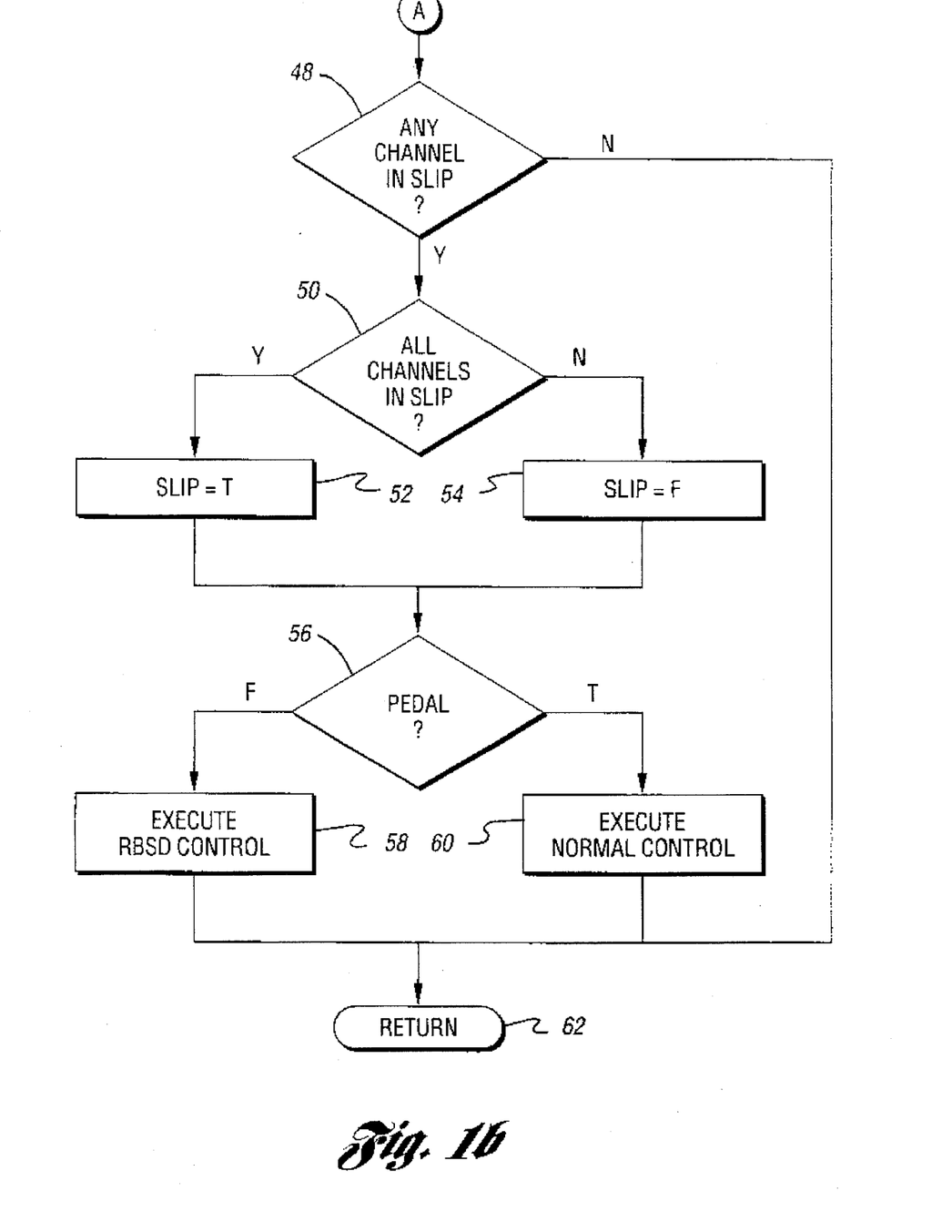

As previously discussed, brake switch failure may be indicated by either the absence of a brake input signal, or by the continuous generation of a brake input signal (i.e., continuous "on" or "high"). At vehicle power-up, the control method and system of the present invention initially assume failure of the brake switch in the continuous "on" position. Also at power-up, all control flags default to their "false" state.

As seen in FIGS. 1a and 1b, assuming a "high" brake input signal at decision block 12, the present invention first determines whether this has been the case since power-up, and whether the vehicle has reached a preselected threshold velocity after starting at zero velocity at power-up. If so, this is an indication that the brake switch is inoperative, having actually failed in the "on" position.

To make this determination, the present invention employs a fault code mechanism. This mechanism may be implemented by blocks 14, 16, 18, 20, 22 and 24. More specifically, at decision block the status of a brake switch history flag is checked. The switch history flag is used to provide an historical indication that the brake switch has been operative. As previously stated, the default state of that flag is false, indicating that the fault code mechanism has not yet been disabled. As a result, the control method and system proceed to decision block 16.

However, after subsequent passes through the brake switch control flowchart 10, switch history flag may be set true. In that event, the control method and system will bypass the fault code mechanism at decision block 14 and proceed to decision block 26. The setting of the switch history flag is described in detail below.

At decision block 16, the present invention checks whether the brake input signal has been high since vehicle power-up. If so, the vehicle velocity at power-up and the present vehicle velocity are checked at decision blocks 18 and 20. If not, the present invention proceeds to decision block 26.

If, at decision blocks 18 and 20, the initial vehicle velocity was zero and the present vehicle velocity exceeds a preselected threshold, then the present invention determines that the brake switch has failed in the "on" position. An "information only" fault code is then written at block 22 indicating that the brake switch is inoperative. Since it is for information only, the writing of that fault code does not result in disablement of the vehicle ABS. Instead, should an ABS event occur, the present invention executes normal control of ABS at block 24.

Alternatively, the present invention could execute RBSD control of ABS at block 24 should an ABS event occur. In addition to the presence of the fault code, such RBSD control would also be based upon the state of a pedal flag used to indicate whether the vehicle operator has depressed the vehicle brake pedal. More specifically, given the presence of the fault code, RBSD control would execute if the pedal flag is true, indicating the vehicle operator has depressed the brake pedal. RBSD control, as well as the setting and clearing of the pedal flag, are discussed in greater detail below.

If, however, either of the velocity conditions at decision blocks 18 and 20 are not met, the present invention again proceeds to decision block 26. As is readily apparent, the fault code mechanism will therefore be bypassed in the event that power-up of the vehicle takes place when the vehicle is already in motion. This prevents false setting of the fault code where the vehicle is powered-up at speed with the brake applied.

As described above, in the event that the fault code mechanism is inapplicable or has been disabled, the present invention determines that the brake switch is currently operative. The state of the brake input signal being high, the control method and system of the present invention then proceed to decision block 26.

At decision block 26, the state of the pedal flag is checked. As previously stated, the pedal flag is used to indicate whether the vehicle operator is currently depressing the brake pedal. Since the brake switch is currently operative, the high state of the brake input signal indicates that the vehicle operator is depressing the brake pedal. Therefore, if the state of the pedal flag at decision block 26 is false, the pedal flag is set true at block 28 and the present invention proceeds to decision block 48. If, however, the state of the pedal flag is true, the present invention proceeds to decision block 30.

At decision block 30, the state of an s-control flag is checked. The s-control flag is used to indicate whether at least one channel in the vehicle ABS is experiencing slip or deceleration significant enough to have isolated a vehicle brake (or brakes) from brake fluid pressure in the master cylinder, or whether the state of the brake input signal from the brake switch has transitioned from low to high.

If, at decision block 30, the state of the s-control flag is true, indicating that at least one ABS channel has isolated or that the brake input signal from the brake switch has transitioned from low to high, the switch history flag is set true at block 32. Thereafter, or if the state of the s-control flag at decision block 30 is false, the present invention proceeds to decision block 48.

As previously stated, the switch history flag is used to provide an historical indication that the brake switch has been operative. Thus, if the pedal and s-control flags are true, indicating the vehicle operator has depressed the brake pedal and at least one ABS channel has isolated, the switch history flag must be set true to indicate history of an operative brake switch.

Referring again to decision block 12, if the state of the brake input signal is low, the state of the pedal flag is checked at decision block 34. Since the brake switch is currently operative, the low state of the brake input signal indicates that the vehicle operator is not depressing the brake pedal. As a result, if the state of the pedal flag at decision block 34 is true, the pedal flag is set false at block 36 and the present invention proceeds to decision block 48. If, however, the state of the pedal flag is false, the present invention then determines whether the brake switch has ever been operative, and whether any ABS channel is not experiencing significant slip. If not, this is another indication that the brake switch is inoperative, having failed in a "low" state.

To make this determination, the present invention employs another fault code mechanism. This mechanism may be implemented by blocks 38, 40, 42 and 44. More specifically, at decision block 38, the state of the switch history flag is checked. As previously described, a true switch history flag indicates that the brake switch has previously been operative. In that event, the fault code mechanism is bypassed. Moreover, since the brake switch is currently operative and the state of the pedal flag is false, indicating that the vehicle operator is not depressing the brake pedal, the switch history flag is also set false at block 46 and the present invention proceeds to decision block 48.

However, if the state of the switch history flag at decision block 38 is false, the present invention then checks the state of a slip flag at decision block 40. The slip flag is used to indicate whether an actual ABS event is underway. As will be described in greater detail below, certain conditions can cause only some ABS channels to experience slip or deceleration. The present invention requires all ABS channels to experience significant slip or deceleration, and to have been active for at least one second, before the slip flag is set true. In such a fashion, the slip flag provides a more accurate indication of an actual ABS event. As will also be described in greater detail below with reference to FIG. 6, the system of the present invention preferably comprises three ABS channels, namely right-front, left-front and rear. However, any number of ABS channels may be employed.

A false slip flag at decision block 40 indicates that all channels have not been active in ABS for at least one second. In that event, the present invention proceeds to decision block 48. However, if the state of the slip flag at decision block 40 is true, indicating that an actual ABS event is underway, it is highly likely that the brake switch is inoperative. In that event, an information only fault code similar to that described above is written at block 42 indicating that the brake switch is inoperative. Once again, since it is for information only, the writing of that fault code does not result in disablement of the vehicle ABS. Instead, should an ABS event occur, the present invention simply executes RBSD control of ABS at block 44.

Still referring to FIGS. 1a and 1b, at decision block 48, the present invention determines whether any ABS channel is experiencing significant slip. Slip may be defined as significant where wheel slip exceeds a preselected individual wheel slip threshold, or where a wheel deceleration threshold is met. The level of such a slip threshold may be either the normal operation or low sensitivity levels described above, depending upon the state of the pedal flag. When the pedal flag is true, indicating the vehicle operator has depressed the brake pedal and the brake switch is likely operative, the normal operation level of the slip threshold will be employed. When the pedal flag is false, indicating the vehicle operator is not depressing the brake pedal and the brake switch may be inoperative, the low sensitivity level of the slip threshold will be employed.

If, at decision block 48, at least one ABS channel is experiencing significant slip, the present invention proceeds to decision block 50. If not, the present invention returns at block 62 to the start of the brake switch control flowchart 10.

At decision block 50, the present invention determines whether all ABS channels are experiencing significant slip or deceleration, and have been active in ABS for at least one second. If so, the slip flag is set true at block 52, indicating that an ABS event is underway. If not, the slip flag is set false at block 54, indicating that all channels have not been active in ABS for at least one second.

In such a fashion, the slip flag will not be set true where only some of the ABS channels are experiencing significant slip due any number of conditions such as a deformable driving surface, activation of the vehicle parking brake, aqua-planing, or drivetrain induced slip from throttle lift or downshifting. Thus, mere activation of the vehicle parking brake will not result in setting the slip flag true since the parking brake acts only on the rear wheels, which are associated with the rear ABS channel or channels.

Thereafter, the state of the pedal flag is checked at decision block 56. As previously described, a true pedal flag indicates that the vehicle operator is currently depressing the brake pedal. When combined with the indication that at least one ABS channel is experiencing significant slip from decision block 48, a true pedal flag also indicates that the brake switch is likely operative. As a result, if the pedal flag is true, the present invention executes normal control of ABS at block 60.

However, a false pedal flag at decision block 56 indicates that the vehicle operator is not currently depressing the brake pedal. When combined with the indication that at least one ABS channel is experiencing significant slip, a false pedal flag also indicates that the brake switch may be inoperative. In that instance, RBSD control of ABS is executed at block 58. Whether RBSD or normal control of ABS is executed at blocks 58 or 60, the present invention thereafter returns at block 62 to the start of the brake switch control flowchart 10.

Figures 2, 3, 4:
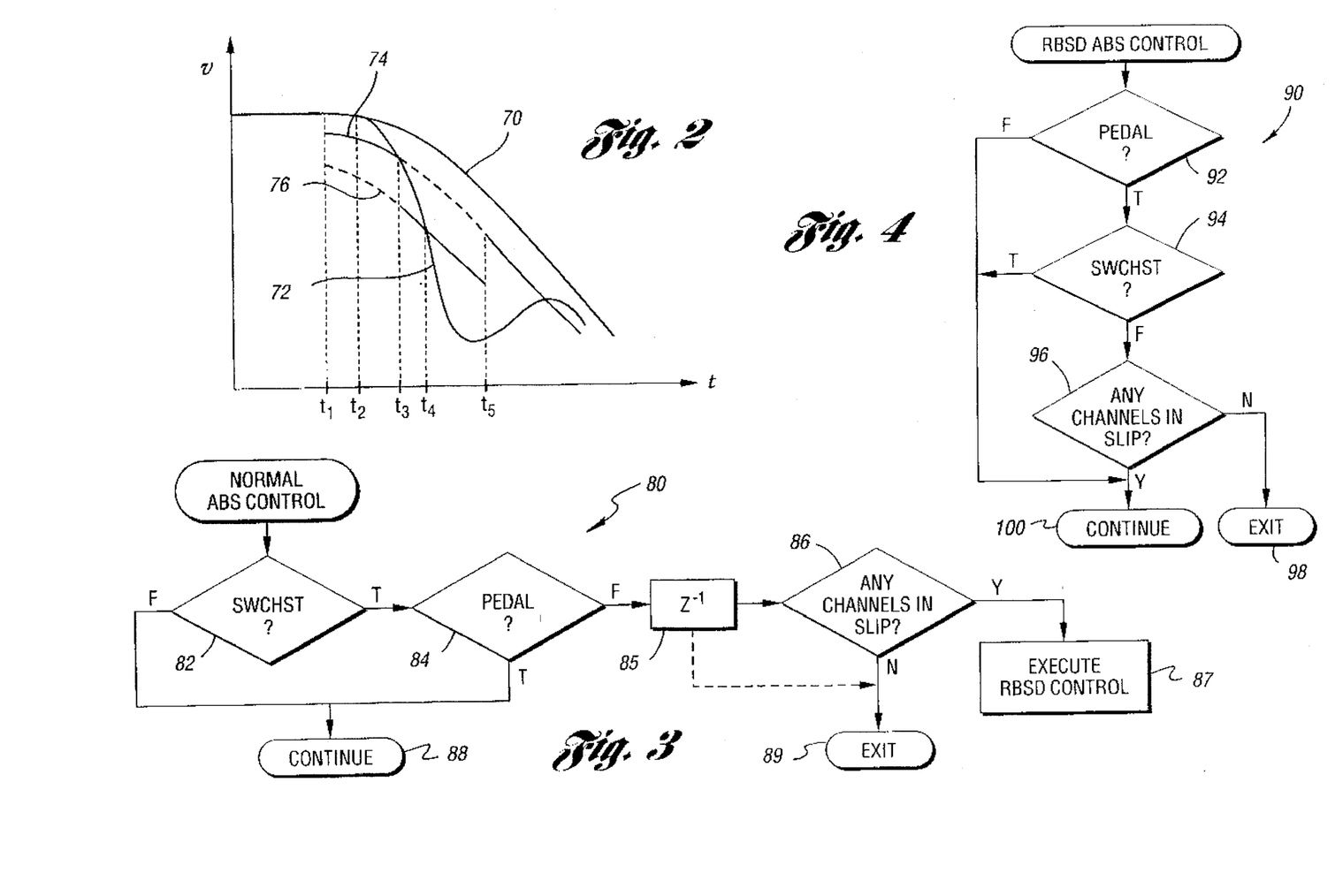
FIG. 2 is a graphical representation of RBSD control of ABS according to the present invention.
FIG. 3 is a flowchart depicting a portion of the control logic of the present invention during normal control of ABS.
FIG. 4 is a flowchart depicting a portion of the control logic of the present invention during RBSD control of ABS.

Referring now to FIG. 2, RBSD control of ABS is depicted graphically. Curves 70 and 72 represent vehicle and wheel velocities, respectively, as a function of time during an ABS event wherein the present invention, as described in detail above, determines that the vehicle brake switch is inoperative. In that regard, the RBSD control shown is that executed according to the present invention at blocks 44 and 58 (and alternatively at block 24) in FIGS. 1a and 1b. The normal operation level and the low sensitivity level of the slip threshold are denoted by reference numerals 74 and 76, respectively.

As seen therein, at time $t_1$, in response to depression of the vehicle brake pedal by the vehicle operator, both the vehicle 70 and wheel 72 velocities begin to decrease. At time $t_2$, the wheel velocity 72 begins to depart from, or decrease more rapidly than, the vehicle velocity 70. At time $t_3$, the wheel velocity 72 falls below the normal operation level of the slip threshold 74, which would result in ABS activation if the brake switch were operative.

However, since the brake switch is inoperative, ABS activation does not occur until time $t_4$ when the wheel velocity 72 falls below the low sensitivity level of the slip threshold 76. Thereafter, at time $t_5$, the slip threshold reverts from the low sensitivity level 76 initially required for ABS activation, given the inoperative brake switch, to the normal operation level 74.

As is readily apparent from FIG. 2, in the event that ABS activation occurs in the absence of an indication that the brake switch is operative, a high level of slip results due to the low sensitivity level of the slip threshold. As a result, control of the ABS dump valves is modified to initially produce a greater than normal brake fluid pressure reduction in the first ABS control cycle in an effort to bring the wheel velocity back into recovery with the vehicle velocity. In the preferred embodiment of the present invention, therefore, brake fluid pressure is reapplied in a more aggressive fashion to overcome this initially greater than normal brake fluid pressure reduction.

Referring next to FIGS. 3 and 4, flowcharts depicting portions of the control logic of the present invention during normal and RBSD control of ABS are shown, denoted generally by reference numerals 80 and 90, respectively. As is described in greater detail below, in particular situations, the pedal and switch history flags described above with reference to FIGS. 1a and 1b can also be used advantageously in normal and RBSD control of ABS during an ABS event.

Referring again to FIGS. 1a and 1b, the state of the switch history flag generally follows that of the pedal flag, with a one loop delay. That is, when the pedal flag goes false, the switch history flag also goes false one loop later. Similarly, when the pedal flag goes true, the switch history flag also goes true one loop later. It can therefore be seen that there may be a one loop period where the pedal flag is true while the switch history flag is false, or where the pedal flag is false while the switch history flag is true. It is this one loop difference in states between the pedal and switch history flag that allows for advantageous control strategy in certain situations.

In prior art vehicle ABS, when the vehicle operator stops depressing the brake pedal during an ABS event wherein normal ABS control is executing, ABS activation will continue for a short time with a pressure apply sequence. With the present invention, however, as seen in FIG. 3, if the state of the switch history flag is true at decision block 82, and the state of the pedal flag is false at decision block 84, indicating that the vehicle operator has recently stopped depressing the brake, ABS activation immediately ceases for one loop as indicated by blocks 85 and 89. If, however, the switch history flag is false or the pedal flag is true, normal ABS control continues at block 88.

Where ABS activation has ceased for one loop at block 85, slip in each ABS channel is then checked at decision block 86. During the subsequent loops if slip in any of the ABS channels exceeds the low sensitivity level of the slip threshold 76 from FIG. 2, RBSD control of ABS is executed at block 87 since the vehicle operator is not depressing the brake pedal (i.e., pedal=false). As is readily apparent, execution of RBSD control at block 87 corresponds to execution of RBSD control at block 58 of FIG. 1b wherein the pedal flag is false and at least one ABS channels is experiencing slip in excess of the low sensitivity level of the slip threshold.

If, during the subsequent loop, slip in each ABS channel fails to exceed the low sensitivity level of the slip threshold 76 depicted in FIG. 2, ABS remains de-activated at block 89. Thus, in the present invention, if the vehicle operator stops depressing the brake pedal during an ABS event wherein normal ABS control is executing, ABS activation ceases unless slip in at least one ABS channel exceeds the low sensitivity level of the slip threshold. In that event, after a one loop delay wherein the switch history flag is cleared (i.e., set false), RBSD control of ABS will be executed.

Also in prior art vehicle ABS, during an ABS event wherein RBSD control of ABS is executing absent application of the brake pedal by the vehicle operator, ABS activation does not immediately cease when the ABS event ceases. Instead, ABS activation is intentionally designed to continue for some short preselected time period to provide for hysterisis. During that time, the vehicle brakes will continue to be isolated from the brake fluid pressure in the master brake cylinder. Thus, if the vehicle operator attempts to depress the brake pedal during that time, he will encounter a "hard" pedal. More specifically, the vehicle operator will only be allowed to increase brake fluid pressure at the vehicle brakes incrementally, according to the pulse time of the ABS isolation valves.

With the present invention, as seen in FIG. 4, if the state of the pedal flag is true at decision block 92, the state of the switch history flag is false at decision block 94, and no ABS channel is experiencing significant slip at decision block 96, ABS activation immediately ceases at block 98. If any of these conditions are not met, RBSD control of ABS continues at block 100. Thus, during an ABS event wherein RBSD control of ABS is executing absent application of the brake pedal by the vehicle operator, ABS activation will cease when the ABS event ceases. In such a fashion, the vehicle operator will not subsequently encounter a "hard" pedal. Instead, the vehicle operator may depress the brake pedal and immediately receive the level of brake fluid pressure requested, provided that level does not create slip sufficient to again cause ABS activation.

Figure 5:
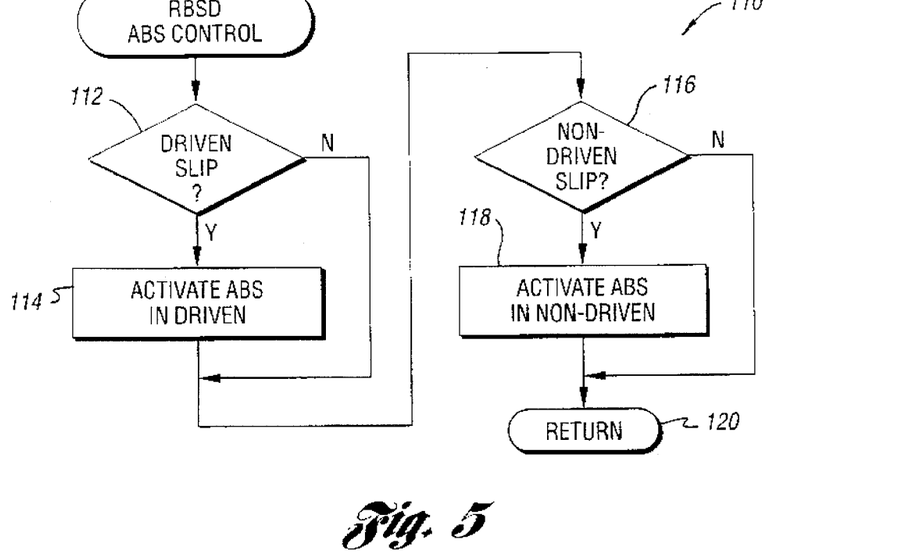
FIG. 5 is a flowchart depicting another portion of the control logic of the present invention during RBSD control of ABS.

Referring next to FIG. 5, a flowchart depicting another portion of the control logic of the present invention during RBSD control of ABS is shown, denoted generally by reference numeral 110. As seen therein, during RBSD control of ABS, the driven wheels are first checked for significant slip at decision block 112. If significant slip is present in the driven wheels, ABS for the driven wheels is activated at block 114. If not, ABS activation in the driven wheels is bypassed and the non-driven wheels are checked for significant slip at decision block 116. If significant slip is present in the non-driven wheels, ABS for the non-driven wheels is activated at block 118. If not, ABS activation in the non-driven wheels is bypassed and the present invention returns at block 120 to the start of RBSD control 110.

Thus, according to the present invention, ABS activation during RBSD control is slip-dependent in all ABS channels. As previously described, significant slip may occur in only one ABS channel due to any number of conditions such as a deformable driving surface, activation of the vehicle parking brake, aqua-planing, or drivetrain induced slip from throttle lift or downshifting. In such instances, there is no reason to activate ABS and isolate the vehicle brakes in those channels where significant slip does not exist.

Since all vehicle obtain most of their braking effort from the front wheel brakes, the slip-dependent ABS activation feature of the present invention can be especially important in rear wheel drive vehicles. Where significant slip occurs only in the rear channel or channels, due to any one of the previously mentioned conditions, the present invention will not isolate the front wheel brakes by also activating ABS in the front channel or channels. The front wheel brakes therefore remain available to provide maximum braking effort.

Figure 6:
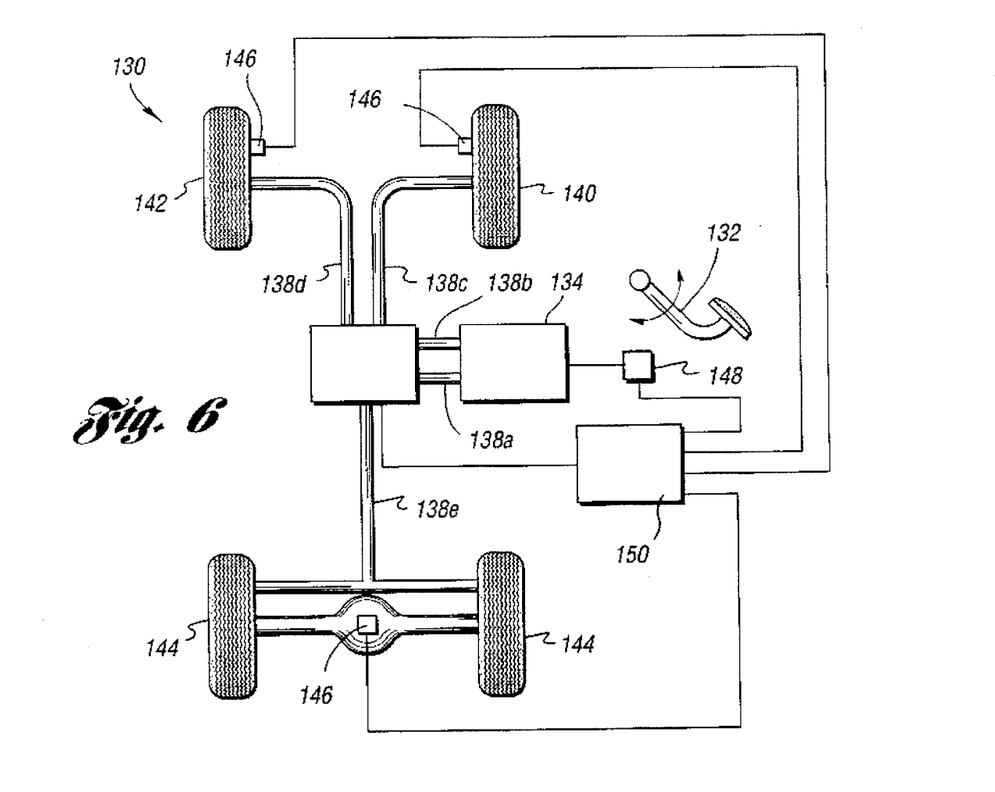
FIG. 6 is a schematic diagram of the control system of the present invention.

Referring finally to FIG. 6, a schematic diagram of the control system of the present invention is shown, denoted generally by reference numeral 130, in conjunction with an ordinary passenger vehicle anti-lock brake system. The ABS includes a brake pedal 132, master brake cylinder 134, control valves 136, brake fluid conduit 138a, 138b, 138c, 138d and 138e, as well as right front wheel 140, left front wheel 142, and a pair of rear wheels 144.

The control system 130 of the present invention comprises three vehicle wheel speed sensors 146 for measuring the velocity of each of the front wheels 140, 142, and the rear wheels 144. The control system further comprises a brake switch 148 and an ABS control unit 150. Each of the wheel sensors 146, as well as the brake switch 148, are operatively connected to the control unit 150. The control unit 150, in turn, is itself operatively connected to the ABS valves 136. The operative connections described are preferably electrical, but may also be other forms of connection, such as fiber optic.

In operation, as described in detail above with reference to FIGS. 1a and 1b, when the vehicle operator applies the brake pedal 132 in response to a desire for vehicle braking, the brake switch 148, if operative, generates a brake input signal for receipt by the control unit 150. However, if inoperative, the brake switch 148 fails to generate the brake input signal. Alternatively, if inoperative, the brake switch 148 may also generate a continuous brake input signal, indicating failure of the brake switch in the "on" position. As described herein, the brake switch 148 is an ordinary electrical switch. However, as is readily apparent, other brake switches, including optic, hydraulic, pneumatic, position indicators and pressure transducers, may also be employed. Alternatively, a brake switch sensor may also be employed as a separate component in order to determine brake switch operativeness.

As described in greater detail above with reference to FIGS. 1a, 1b, and 3–5, if the brake switch 148 is operative, the control unit 150 will execute normal control of ABS during an ABS event. However, in the event that the brake switch 148 is inoperative, the control unit 150 will execute RBSD control of ABS during an ABS event. Such RBSD control is as shown graphically in FIG. 2, and as referenced at blocks 44 and 58 (and alternatively at block 24) in FIG. 1a. In that regard, for the purposes of the present invention, a brake switch 148 that has failed in the "on" position may result in execution of RBSD control.

The control unit 150 takes the form of a commercially available programmable microprocessor. To activate ABS, the control unit 150 is operatively connected to the ABS valves 136, which provide for regulation of the brake fluid pressure from the master brake cylinder 134 to the individual wheel brakes (not shown) of each of the wheels 140, 142, 144 via the brake fluid conduits 138a, 138b, 138c, 138d, and 138e.

The control method and system of the present invention have been described and shown herein in conjunction with an ordinary passenger vehicle anti-lock brake system. However, it should be readily apparent that the control method and system of the present invention are suitable for use in any vehicles wherein ABS is utilized.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A control method for a vehicle anti-lock brake system, ABS, the vehicle having at least two wheels and a brake switch, the method comprising:

monitoring the brake switch for generation of a brake input signal;

determining that the brake switch is inoperative in the absence of a change in state of the brake input signal;

comparing a wheel velocity to a first slip threshold when the brake switch is operative;

activating the ABS when the wheel velocity falls below the first slip threshold and the brake switch is operative;

comparing a wheel velocity to a second slip threshold when the brake switch is inoperative, the second slip threshold being less than the first slip threshold; and activating the ABS when the wheel velocity falls below the second slip threshold and the brake switch is inoperative.

2. The method of claim 1 further comprising modifying the slip threshold from the second level to the first level after activating the ABS when the wheel velocity falls below the second slip threshold and the brake switch is inoperative.

3. The method of claim 1 further comprising:

monitoring a brake pedal for generation of a brake pedal input signal; and deactivating the ABS when the brake input signal is absent and the brake pedal input signal is present.

4. A control system for a vehicle anti-lock brake system, ABS, the vehicle having at least two wheels and a brake switch, the system comprising:

means for monitoring the brake switch for generation of a brake input signal;

means for determining that the brake switch is inoperative in the absence of a change in state of the brake input signal;

means for comparing a wheel velocity to a first slip threshold when the brake switch is operative;

means for activating the ABS when the wheel velocity falls below the first slip threshold and the brake switch is inoperative;

means for comparing a wheel velocity to a second slip threshold when the brake switch is inoperative, the second slip threshold being less than the first slip threshold; and means for activating the ABS when the wheel velocity falls below the second slip threshold and the brake switch is inoperative.

5. The system of claim 4 further comprising means for modifying the slip threshold from the second level to the first level after activating the ABS when the wheel velocity falls below the second slip threshold and the brake switch is inoperative.

6. The system of claim 4 further comprising:

means for monitoring a brake pedal for generation of a brake pedal input signal; and means for deactivating the ABS when the brake input signal is absent and the brake pedal input signal is present.

* * * * *